United States Patent [19]

O'Keefe

[11] Patent Number: 4,598,408
[45] Date of Patent: Jul. 1, 1986

[54] HIGH EXTRACTION EFFICIENCY CYLINDRICAL RING RESONATOR

[75] Inventor: John D. O'Keefe, Manhattan Beach, Calif.

[73] Assignee: TRW Inc., Redondo Beach, Calif.

[21] Appl. No.: 663,294

[22] Filed: Oct. 22, 1984

[51] Int. Cl.$^4$ ............................................. H01S 3/083
[52] U.S. Cl. ........................................ 372/94; 372/95;
372/99; 372/103; 372/108; 350/619
[58] Field of Search .................. 372/95, 93, 108, 99,
372/94, 103; 350/619

[56] References Cited

U.S. PATENT DOCUMENTS 4,514,850  4/1985  Holmes et al. ..................... 372/95
4,516,244  5/1985  Holmes ................................ 372/95

Primary Examiner—Leon Scott, Jr.
Attorney, Agent, or Firm—Noel F. Heal; James W. Paul

[57] ABSTRACT

An annular ring resonator for a high-energy laser, including a waxicon/reflaxicon pair and a conical rear mirror, which combine to provide high energy extraction efficiency, reduced sensitivity to alignment errors, and no polarization state mixing. A cylindrical beam returned from a scraper mirror is first expanded by the waxicon to an annular beam that makes a first pass through a gain region of the laser. The annular beam impinges on the conical mirror and is reflected as an annular beam, to make a second pass of the gain region before encountering the reflaxicon, which compacts the beam for transmission to the scraper mirror. One embodiment employs a double-cone rear mirror, and another employs a single conical surface. The structure may also employ feedback decentering.

10 Claims, 6 Drawing Figures

HIGH POWER LINEAR UNSTABLE RESONATOR

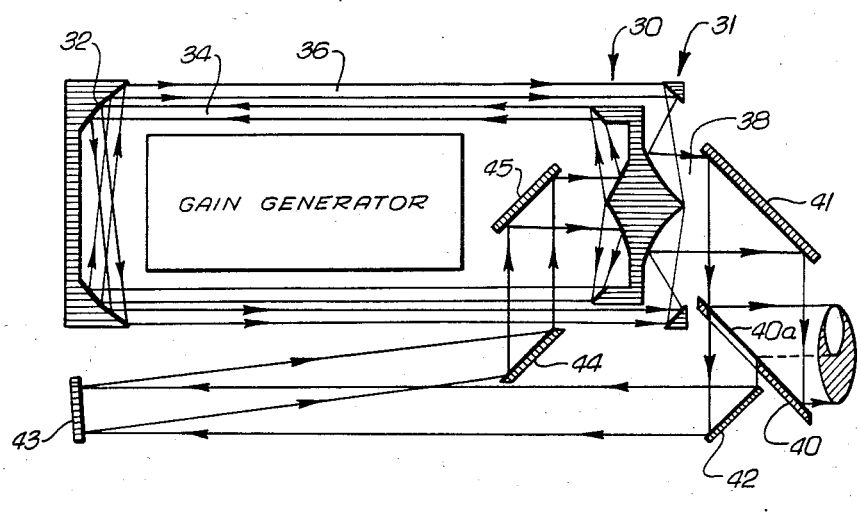
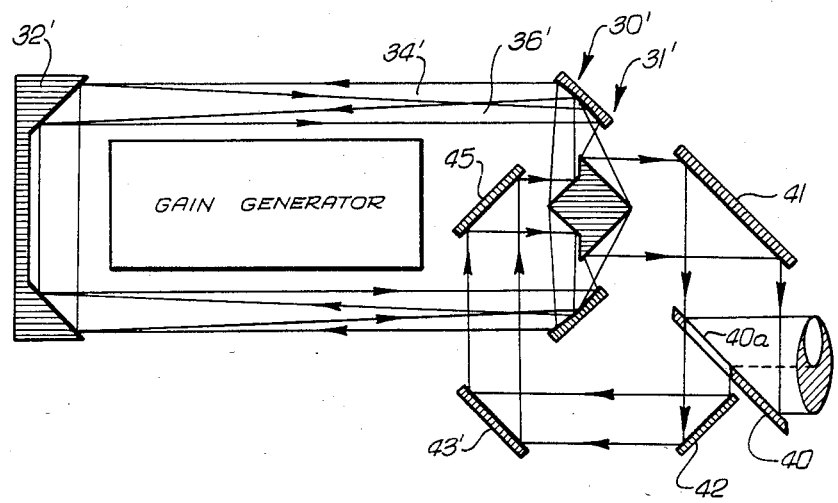

HIGH EXTRACTION EFFICIENCY CYLINDRICAL RING RESONATOR

BACKGROUND OF THE INVENTION

This invention relates generally to lasers, and more particularly, to laser resonators of cylindrical or annular configuration. Obtaining high-power beams from conventional linear laser resonators poses a number of difficult problems. These problems can be catagorized as relating to power extraction, beam quality and ease of fabrication. The output power of laser is proportional to the lasing medium volume. For most laser media, the lasing width is restricted to several centimeters. Thus, the other dimensions (length and height) must be large for high powers. An example of an implementation of a conventional linear resonator on a lasing medium configuration (large volume) for high powers is shown in FIG. 1, which is discussed in more detail below. The outcoupled beam from the configuration would have a height-to-width ratio of more than several hundred to one, and this would not match typical beam transfer optics and transmitting telescope configurations. Moreover, the fabrication and support of the tall and narrow optics required would be difficult. The laser resonator must have a cavity length that is either impracticably large, or has to be made in a folded configuration that increases the number of mirrors required. Long paths through the lasing medium can also result in degradation in beam quality, and such lasers are extremely sensitive to mirror alignment. In addition, the linear configuration would have a unidirectional flow of gases which would result in a net thrust on a laser. This would not be desirable for either airborne or space based applications.

For these and other reasons, designers of high-power lasers have more recently shifted their attention to cylindrical lasing medium and annular resonator configurations. Configuring the lasing medium in a cylindrical shape allows large lasing volumes to be realized with compactness and structural rigidity. There is also negation of flow thrust due to the radial symmetry. The remaining problem has been to find annular laser resonator configurations to extract the power from the lasing medium efficiently, while maintaining good beam quality.

The conventional linear laser with an unstable resonator has one important attribute. It provides inherently good mode control. Undesirable higher-order modes of operation of the laser are not present, and the laser therefore provides good beam quality. Cylindrical or annular lasers have problems in maintaining mode control and thus may not provide good beam quality. If some of the power could be sacrificed, spatial filtering could be employed to remove unwanted higher-order modes of lasing, but spatial filtering is inefficient from a power standpoint.

Various designs and proposals have been advanced to seek, in effect, the annular analog of the conventional unstable linear laser resonator. The ideal annular laser resonator configuration would be one that combined the advantage of beam quality, which is inherent in the unstable linear resonator, with the advantages of efficient use of area and thus high power, and of symmetry inherent in the annular configuration. However, as will be explained in more detail, annular laser configuration prior to this invention have been deficient in some important respects.

The common features of annular lasers are an annular gain region and an annular resonator. The principal requirement for the resonator is that it extract a large amount of power efficiently from the annular gain region, in such a manner that mode control, and therefore beam quality, are preserved.

The simplest annular resonator is the toric unstable resonator (TUR), which consists of two toric mirrors arranged at each end of the annular gain region. Since the toric optics have no single optic axis, there is no diffractive coupling in the azimuthal direction; thus there is no azimuthal mode control. Modifications to enhance mode control in the toric resonator have not been successful, and the configuration has been largely discarded by investigators.

An annular resonator configuration known as the half-symmetric unstable resonator with internal axicon (HSURIA) was intended to provide the desired combination of advantages. It combines the principal features of the toric unstable resonator, but also includes an optical element known as an axicon to convert the annular beam to a compacted cylindrical one. One form of the axicon is known as a waxicon, named for its letter-W shape when viewed in crosssection. A waxicon is basically an arrangement of two approximately conical mirrors. A first, outer conical mirror with an internal reflective surface reflects the annular beam inwardly toward a second, inner conical mirror, concentric with the first and having an external reflective surface. A section taken through a waxicon shows the two conical mirrors in a letter-W configuration. The annular beam is reflected radially in toward the optical axis of the waxicon by the first conical mirror, and is then reflected in an axial direction by the second conical mirror, the effect being to compact the annular beam into a cylindrical one, directed back along the central axis of the original annular beam. The compacted beam impinges on a scraper mirror, which reflects a central portion of the beam back into the resonator optics, and allows an out-coupled portion of the compacted beam to pass. Instead of a waxicon, a reflaxicon may be used. A reflaxicon also has two concentric conical mirrors, but the inner one is in a reversed orientation as compared with the waxicon. In a sectional view of a reflaxicon, the two conical mirrors appear to be parallel, and the compacted cylindrical beam continues in the same direction as the original annular beam.

The basic HSURIA configuration includes a waxicon or reflaxicon element at one end of the annular gain region and a plane mirror at the other end of the gain region. The resonator cavity is formed by the waxicon or reflaxicon, the plane mirror, and the feedback mirror, and has the simplicity of its toric optics and a single optical axis in the so-called "compact leg," in which the cylindrical beam is propagated. It is this single optic axis that gives this configuration some degree of mode control. However, the configuration also has some significant drawbacks.

Most importantly, the arrangement is extremely sensitive to mirror alignment, and particularly to any degree of tilt in the rear plane mirror. Substitution of a conic mirror for the plane mirror is sometimes made in an attempt to reduce this effect. The incident light in the annular beam is reflected from one side of the corner cube or conic reflector to the opposite side before being reflected back along the cavity. This poses a very serious polarization problem, in that the polarization of the light is scrambled by the conic or corner cube surface.

A waxicon also inherently scrambles polarization, and it was ultimately discovered that the only physically allowable modes of operation of the HSURIA configuration were either radially or tangentially polarized. As a result, the light beam out-coupled from the resonator tends to be self-cancelling at the optical axis or center of the beam. Thus, the beam when focused and propagated over large distances would have a null on-axis and not produce the required high on-axis intensities.

One solution to the polarization problem is to coat the toric elements of the resonator with special phase-shifting coatings, such that no net polarization shift is produced in a round-trip passage through the resonator. However, the use of coatings tends to aggravate manufacturing problems, since the optical elements have to be made to an extremely fine tolerance. In particular, the apex of the inner conical surface of the waxicon or reflaxicon may not be truncated without losing mode control of the device and coating the surface near the tip is presently not feasible.

If the rear annular optical element of the HSURIA configuration is also replaced by a waxicon, the result is an annular ring resonator. The annular beam passes through the gain region, is compacted by one waxicon, passes through an aperture in a scraper mirror and is then expanded by the second waxicon. Although the annular ring resonator has some advantages over the basic HSURIA configuration, it provides only a single pass through the gain region, and is therefore less efficient in extracting energy from the gain region. Moreover, the annular ring configuration is very sensitive to the relative alignment of the two axicons (either waxicon pairs or reflaxicon pairs). This sensitivity is comparable to that of the HSURIA with a flat rear mirror element. An advantage of the annular ring resonator, however, is that polarization scrambling can be eliminated by the use of two axicons of the same type, i.e. two waxicons or two reflaxicons.

In a conventional annular ring resonator, the scraper mirror is also annular, having a central aperture to pass a return beam back to the compacted leg of the resonator. One approach that alleviates some of the problems of the annular ring resonator is referred to as decentered feedback. The scraper mirror has an offset aperture for passage of the return beam, and the result is that the optical axis of the resonator is no longer centered on the apex of the axicon. The apex can then be truncated without significant loss of mode control.

Even with decentered feedback, the annular ring resonator suffers from alignment sensitivity and low energy extraction efficiency. Accordingly, there is still a need for a resonator structure that overcomes these problems without sacrificing any of the advantages of the annular ring resonator. The present invention satisfies this need.

SUMMARY OF THE INVENTION

The present invention resides in a high-power laser resonator structure that combines the advantages of high extraction efficiency, reduced alignment sensitivity, and elimination of at least first-order polarization problems. In addition, the resonator of the invention can be used in a decentered feedback arrangement, and the flux loading requirements on the inner axicon are substantially reduced.

Briefly, and in general terms, the resonator of the invention comprises a conical rear reflector, a scraper mirror, a waxicon (or reflaxicon) and a reflaxicon (or waxicon). Throughout this description, it will be understood that the waxicon and reflaxicon elements may be exchanged without departing from the invention. The waxicon is positioned to receive a generally cylindrical compacted beam from the scraper mirror, and to produce an expanded annular beam to pass through an annular laser gain region to the conical rear mirror. The reflaxicon is positioned closely adjacent to the waxicon and receives an annular beam reflected from the conical mirror. The reflaxicon produces a generally cylindrical compacted beam directed to the scraper mirror, which has an aperture to pass the return beam for transmission to the waxicon.

The annular beam makes two passes through the gain region, giving a relatively high extraction efficiency compared to that of the conventional annular ring resonator. The annular beam from the waxicon is inverted and reflected by the conical reflector. Then the beam is directed back through the gain region to the reflaxicon (waxicon). The combination of waxicon, reflaxicon and conical reflectors has no net effect on the polarization state of the beam.

In a preferred embodiment of the invention the conical rear reflector is a double cone, having an outer annular segment of a selected cone apex angle, for reflecting the received annular beam toward an inner annular segment contiguous with the outer segment. The inner segment has a different cone apex angle, selected to produce an annular beam parallel with the received annular beam, but with a smaller radius.

In an alternative embodiment of the invention, the conical rear mirror has only a single conical surface, and the two passes of the annular beam partially overlap in the gain region. The waxicon and reflaxicon pair of elements may employ a common outer mirror surface.

The scraper mirror has a decentered aperture in one embodiment of the invention, to provide for decentered feedback operation.

It will be appreciated from the foregoing that the present invention represents a significant advance in the field of high-power lasers. In particular, the invention provides a resonator of the annular ring resonator type, with the advantages of high extraction efficiency, reduced alignment sensitivity, no polarization mixing, and reduced flux loadings at the central axis of the optical elements. Other advantages will become apparent from the following more detailed description, taken in conjunction with the accompanying drawings.

BRIEF DESCRIPTION OF THE DRAWINGS

FIG. 5 is a another schematic view of the resonator of the invention, including a scraper mirror and other turning flat mirrors; and FIG. 6 is a schematic view similar to FIG. 4, but having an alternative rear mirror arrangement.

DESCRIPTION OF THE PREFERRED EMBODIMENTS

Figure 1:
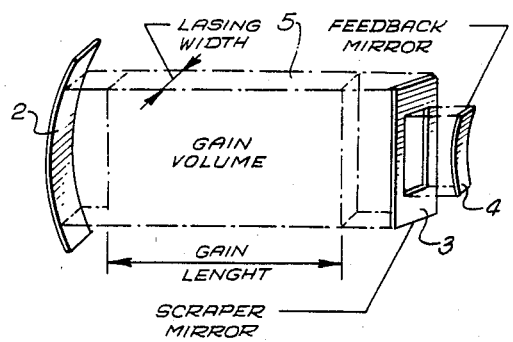
FIG. 1 is a schematic view of a high-power linear unstable resonator of the prior art.

As shown in the drawings for purposes of illustration, the present invention is concerned with improvements in annular ring resonators for use in high-power lasers. Annular configurations are needed to obtain high power outputs from lasers, such as chemical lasers. One advantage of the annular laser is that, since reacting gases are flowed uniformly in all radial directions, reactive forces acting on the laser structure are self-cancelling.

By way of background, FIG. 1 shows a conventional high-power linear unstable resonator, comprising a curved mirror, indicated by reference numeral 2, a scraper mirror 3 and a feedback mirror 4. The gain volume of the device is indicated by the block 5. The output power is proportional to the lasing medium volume, i.e., the gain volume 5. For high powers the gain length and height have to be relatively large, since the gain width is limited to a few centimeters for most lasing media.

This linear configuration has a height-to-width ratio that may be several hundred to one for high powers. Clearly this poses some practical difficulties in fabrication, and in matching the outcoupled beam to other optical components for transmission of the beam.

Figure 2:
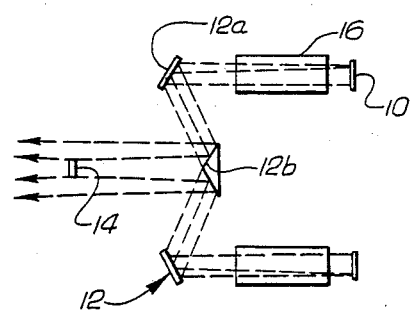
FIG. 2 is a schematic view of a half-symmetrical unstable resonator with an internal axicon (HSURIA)

FIG. 2 shows a relatively simple form of annular laser resonator, including a plane toric mirror, indicated by reference numeral 10, and a reflaxicon 12, which consists of an outer conical mirror 12a and inner conical mirror 12b located on the central axis of the toric mirror. A scraper mirror 14 is located on the same axis. An annular light beam traverses an annular gain region of the laser, indicated at 16, is reflected by the plane toric mirror 10, traverses the gain region again, and then encounters the outer mirror 12a of the reflaxicon 12. The annular beam is then reflected radially toward the inner mirror 12b, from which it is reflected in a generally axial direction toward the scraper mirror 14. Basically, the reflaxicon 12 operates to compact the annular beam into a solid cylindrical one, propagating in the same direction as the annular beam when it impinged on the outer mirror 12a. A portion of the cylindrical beam is reflected from the scraper mirror, and the remainder passes around the scraper mirror and becomes the outcoupled beam from the resonator. The reflected portion is expanded by the reflaxicon 12, passes through the gain region 16 and is reflected by the toric mirror 10 back through the gain region to the reflaxicon.

Instead of the reflaxicon 12, a waxicon (not shown) could be employed. The only significant difference is that the inner mirror is reversed in a waxicon, such that the output beam is a solid cylindrical one, but is propagated in a direction opposite to that in which the annular beam first impinged on the outer mirror 12a.

As discussed earlier in this specification, the configuration shown in FIG. 2 is extremely alignment sensitive, especially to the orientation of the toric mirror 10. Various modifications have been suggested to minimize this problem, such as the substitution of conic or cornercube mirrors for the plane toric mirror 10. These modifications unfortunately result in polarization scrambling, and consequent self-cancellation of light intensity at the optical axis. Phase-shift coatings are typically applied to the mirror surfaces to minimize this problem, but the coatings themselves pose fabrication difficulties, since fine tolerances are needed to maintain mode control and beam quality.

Figure 3:
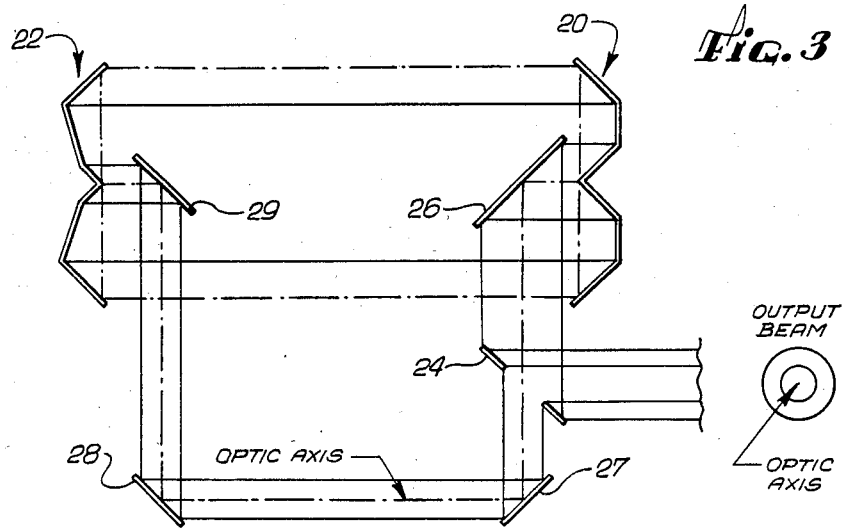
FIG. 3 is a schematic view of a conventional annular ring resonator.

FIG. 3 shows a conventional annular ring resonator that can be used to overcome some of the disadvantages of the FIG. 2 embodiment and its subsequent improvements. The annular ring resonator includes two axicons, shown as waxicons 20 and 22. The term "axicon" encompasses both "waxicon" and "reflaxicon." In this instance, the ring resonator could have been illustrated using reflaxicons. The resonator also includes a scraper mirror 24 with a central aperture, and four turning flat mirrors 26-29. An annular beam impinging on waxicon 20 is compacted into a cylindrical beam, and reflected by a turning flat mirror 26 toward the scraper mirror 24. An annular portion of the beam is reflected from the scraper mirror 24 and becomes the out-coupled beam. The remaining central portion passed by the scraper mirror 24 is reflected by the remaining turning flat mirrors 27-29 in turn, until it is directed toward the inner mirror of the other waxicon 22. This waxicon 22 acts as a beam expander and produces an annular beam directed through the gain region (not shown) and back to the first waxicon 20.

The principal disadvantage of this conventional annular ring resonator is that the beam makes only a single pass through the gain region, and the extraction efficiency is therefore relatively low. There is also an inherent sensitivity to alignment of the two axicons.

In accordance with the invention, the advantages of prior resonator configurations are combined in a novel resonator construction. The advantages obtained are a high efficiency of energy extraction, lack of polarization scrambling, and reduction of alignment sensitivity. The novel structure is shown schematically in FIG. 4. It comprises a waxicon/reflaxicon pair, indicated at 30 and 31, and a double conical mirror 32. Light from a scraper aperture (not shown in FIG. 3) first impinges on the inner mirror of the waxicon and is expanded into an annular beam 34. In this configuration of the invention, the conical mirror 32 has an outer segment 32a and a contiguous inner segment 32b. The annular beam 34 from the waxicon 30 impinges first on the inner segment 32b, which is oriented to provide deflection of the beam onto the outer segment 32a. The outer segment 32a is, in turn, oriented to reflect the impinging beam along an annular path 36 concentric with that of the beam 34, but of greater radius. This outer annular beam passes around the waxicon 30 and impinges on the outer mirror of the reflaxicon 31. The reflaxicon then produces a compacted cylindrical beam 38 for transmission to the scraper mirror.

The annular beams 34 and 36 provide two passes through the gain region of the laser, and therefore yield a relatively high extraction efficiency. Moreover, the combination of a conical rear mirror and a waxicon/reflaxicon pair result in no polarization scrambling during a complete pass through the resonator. Also, the use of the conical rear mirror for rotation of the annular beam results in greatly reduced sensitivity to alignment.

Figure 4:
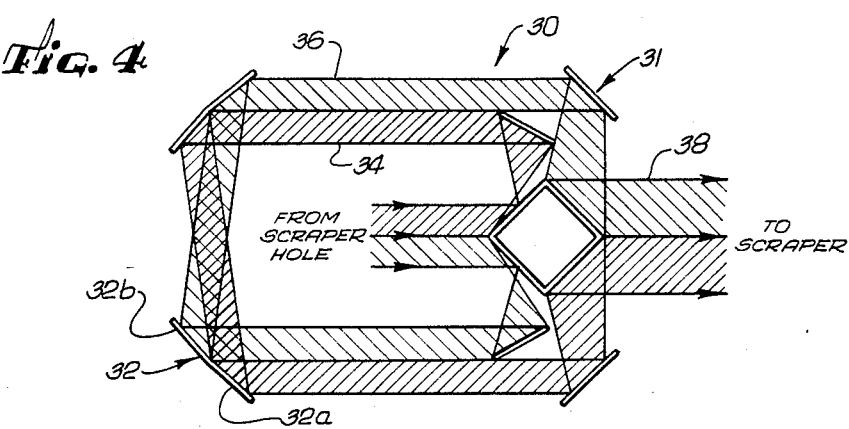
FIG. 4 is a fragmentary schematic view of the resonator of the invention.

FIG. 5 shows the resonator of the invention with like elements bearing the same respective reference numerals as in FIG. 4, and showing a scraper mirror 40, together with five flat mirrors 41-45 in the compact leg of the resonator. The mirrors in the compact leg can be configured to produce mode rotation and further polarization control and aberration sensitivity tolerance. The cylindrical beam emerging from the reflaxicon 31 is first reflected by mirror 41 onto the scraper mirror 40, which has a decentered aperture 40a. The beam emerging from the scraper mirror 40 is reflected from mirrors 42-45 in turn, until it is directed toward the inner mirror of the waxicon 30.

FIG. 6 shows a different embodiment of the invention, in which a single conical mirror 32' is substituted for the double conical mirror 32. The waxicon/reflaxicon pair 30', 31' is also differently structured, in that the outer mirrors of the waxicon and reflaxicon are formed as a single mmirror element. Furthermore, the annular beams, here indicated at 34' and 36', passing through the gain region are not truly annular. Beam 34' diverges slightly between the waxicon 30' and the conical mirror 32', and the beam 36' converges slightly as it approaches the reflaxicon 31'. Also, whereas the return beam 36 passed around the outside of the waxicon 30, the return beam 36' in this embodiment passes to the inside of the waxicon outer mirror surface. The arrangement also includes the scraper mirror 40, and includes only four other flat mirrors, indicated at 41, 42, 43' and 45.

The decentered scraper mirror 40 shown in both configurations has the effect of decentering the optical axis, and permits the apexes of the waxicon/reflaxicon to be truncated without significant loss of mode control.

It will be appreciated from the foregoing that the present invention represents a significant advance in the field of resonators for use in high-power lasers. In particular, the invention provides a resonator having relatively high extraction efficiency and low sensitivity to alignment errors, without introducing any scrambing of polarization. Since the need for coatings on the optical elements is reduced, the resonator can be fabricated more easily. Moreover, it can be operated in a decentered feedback fashion, to decenter the optical axis and further alleviate manufacturing problems.

It will also be appreciated that, although specific embodiments of the invention have been described in detail for purposes of illustration, various modifications may be made without departing from the spirit and scope of the invention. Accordingly, the invention is not to be limited except as by the appended claims.

I claim:

1. An annular ring resonator for a high-energy laser, having high extraction efficiency, and comprising:
   a conical rear mirror;
   a scraper mmirror;
   a first axicon positioned to receive a generally cylindrical beam from the scraper mirror, and to produce an expanded annular beam to pass through an annular gain region to the conical rear mirror;
   a second axicon, in opposing position to the first axicon, for receiving an annular beam reflected from the conical rear mirror, and producing a generally cylindrical compacted beam for transmission to the scraper mirror, wherein the scraper mirror has an aperture to pass a return beam for transmission to the first axicon; and
   optical means for transmitting the compacted beam from the second axicon to the scraper mirror and from the scraper mirror to the first axicon;
   whereby the annular beam makes two passes through the gain region, and the combination of two types of axicons and the conical mirror has substantially no net effect on polarization.

2. A resonator as set forth in claim 1 wherein:
the first axicon is a waxicon; and
the second axicon is a reflaxicon.

3. A resonator as set forth in claim 2 wherein:
the conical rear mirror has an outer segment and a contiguous inner segment, each segment having a different conical apex angle;
the annular beam reflected from the waxicon impinges first on the inner segment of the conical mirror and is directed to the outer segment; and
the annular beam reflected from the outer segment of the conical rear mirror is concentric with the annular beam in the opposite direction, but of greater diameter.

4. A resonator as set forth in claim 3 wherein:
the waxicon and reflaxicon share a common outer mirror surface.

5. A resonator as set forth in claim 3 wherein:
the scraper mirror has its aperture decentered, to provide a decentered optical axis for the resonator.

6. A resonator as set forth in claim 2 wherein:
the conical rear mirror is a single conical surface; and
the annular beam reflected from the waxicon impinges on the conical mirror and is first reflected diametrically across the conical mirror and then from the latter mirror back toward the reflaxicon; and
the annular beam reflected from the conical mirror partially overlaps the annular beam directed toward the conical mirror, in the gain region of the laser.

7. A resonator as set forth in claim 6 wherein:
the scraper mirror has its aperture decentered, to provide a decentered optical axis for the resonator.

8. A resonator as set forth in claim 2 wherein:
the scraper mirror has its aperture decentered, to provide a decentered optical axis for the resonator.

9. A resonator as set forth in claim 1 wherein:
the scraper mirror has its aperture decentered, to provide a decentered optical axis for the resonator.

10. A resonator as set forth in claim 1 wherein:
said optical means includes a plurality of flat mirrors for appropriately turning the compact beam.

* * * * *